US008462081B2

(12) United States Patent
Kuo et al.

(10) Patent No.: US 8,462,081 B2
(45) Date of Patent: *Jun. 11, 2013

(54) SEE-THROUGH DISPLAY

(75) Inventors: Huei Pei Kuo, Palo Alto, CA (US);
Laurence M. Hubby, Jr., Palo Alto, CA (US); Steven L. Naberhuis, Corvallis, OR (US); Henryk Birecki, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/043,973

(22) Filed: Mar. 9, 2011

(65) Prior Publication Data
US 2011/0157708 A1 Jun. 30, 2011

Related U.S. Application Data

(62) Division of application No. 11/491,360, filed on Jul. 21, 2006, now Pat. No. 8,212,744.

(51) Int. Cl.
*G09G 5/00* (2006.01)

(52) U.S. Cl.
USPC ........................... 345/8; 345/9; 345/1.1

(58) Field of Classification Search
USPC .................................. 345/8–9, 1.1
See application file for complete search history.

(56) References Cited

U.S. PATENT DOCUMENTS

| | | | |
|---|---|---|---|
| 4,929,048 A | 5/1990 | Cuypers | |
| 6,550,937 B2 | 4/2003 | Glass | |
| 6,829,095 B2 | 12/2004 | Amitai | |
| 6,924,912 B2 * | 8/2005 | Takada | 359/15 |
| 2002/0096985 A1 * | 7/2002 | Hazzard | 313/112 |
| 2003/0133207 A1 * | 7/2003 | Minami et al. | 359/885 |
| 2004/0189612 A1 * | 9/2004 | Bottari et al. | 345/173 |

* cited by examiner

*Primary Examiner* — William L. Boddie
*Assistant Examiner* — Leonid Shapiro

(57) ABSTRACT

A screen includes a first set of louver members at least partially disposed in the screen and located proximate to a first side of the screen, and a second set of louver members at least partially disposed in the screen and located proximate to a second side of the screen. An observer on either side of the screen sees an image produced by light directed to that observer by that set of louvers on the same side of the screen as the observer. Objects on the other side of the screen from the observer are visible to the observer between the louvers.

20 Claims, 14 Drawing Sheets $\varphi_r = \varphi_i$ $\dfrac{\sin \varphi_i}{\sin \varphi_t} =$ constant

SEE-THROUGH DISPLAY

RELATED APPLICATION

This is a divisional patent application which claims priority under 35 U.S.C. 120 from previous U.S. patent application Ser. No. 11/491,360, filed Jul. 21, 2006 now U.S. Pat. No. 8,212,744, entitled "See Through Display," which is incorporated herein by reference in its entirety.

BACKGROUND

Socially and professionally, most people rely on visual display systems of one form or another for at least a portion of their work and/or recreation. Typical displays, such as cathode ray tubes (CRTs), plasma display panels (PDPs) and the like are opaque, or at the very least block the view of background objects directly behind the display system.

See-through display technology for the display of text messages has been advancing, but is primarily limited to the fields of advertising and teleprompting for news and presentation. In advertising, such systems are desirable as they permit a customer to receive text information while viewing actual items such as retail clothing. For news media, teleprompters permit the presenting party to appear as though he or she is maintaining eye contact with the audience. Heads-up see-through displays are also evolving in for use in aircraft and automobiles as they permit the operator of the plane or vehicle to maintain visual awareness of the outside environment while receiving important information such as speed, direction, remaining fuel, etc.

These see-through display systems or heads-up displays are typically achieved by using a transparent piece of glass or plastic mounted at a forty five degree angle. In some configurations there is also a thin coating of reflective material, sufficient to establish a half mirror. With such systems, the projected information is presented only to one side of the display. Thus, for example, the audience does not see the speech scrolling across the teleprompter.

Such systems are reasonably good for high contrast material such as bright text, or images formed of localized bright lines. These systems are poor in the ability to provide sufficient contrast and brightness for gray-scale or full color imagery. In addition, the typical forty five degree tilt results in a rather bulky structure that not suitable for installation in settings where compactness and intimacy might be important. Further, such systems have an extremely narrow field of view—an observer directly in front of the screen can see the text or information, but an observer standing directly to one side or the other may not, or at the very least will perceive a dramatically dimmer image. In addition, such displays can not be placed directly upon a background object such as a map or chart, without the background object then being viewed at an undesirable angle.

Weight, thickness, durability, cost, aesthetic appearance and quality are key considerations for display systems, including see-through systems. Hence, there is a need for a device that overcomes one or more of the drawbacks identified above.

SUMMARY

In particular and by way of example only, according to an embodiment, provided is a see-through display, including: a see-through screen having a front side and opposite thereto a back side, the screen structured and arranged to receive an image signal light and redirect the image signal light into a range of angles, the range centered about a normal to the screen, background image light transmitted generally through the screen with minimal scattering.

DETAILED DESCRIPTION

Before proceeding with the detailed description, it is to be appreciated that the present teaching is by way of example, not by limitation. The concepts herein are not limited to use or application with a specific see-through display. Thus, although the instrumentalities described herein are for the convenience of explanation, shown and described with respect to exemplary embodiments, it will be appreciated that the principles herein may be equally applied in other types of see-through display systems.

Figure 1:
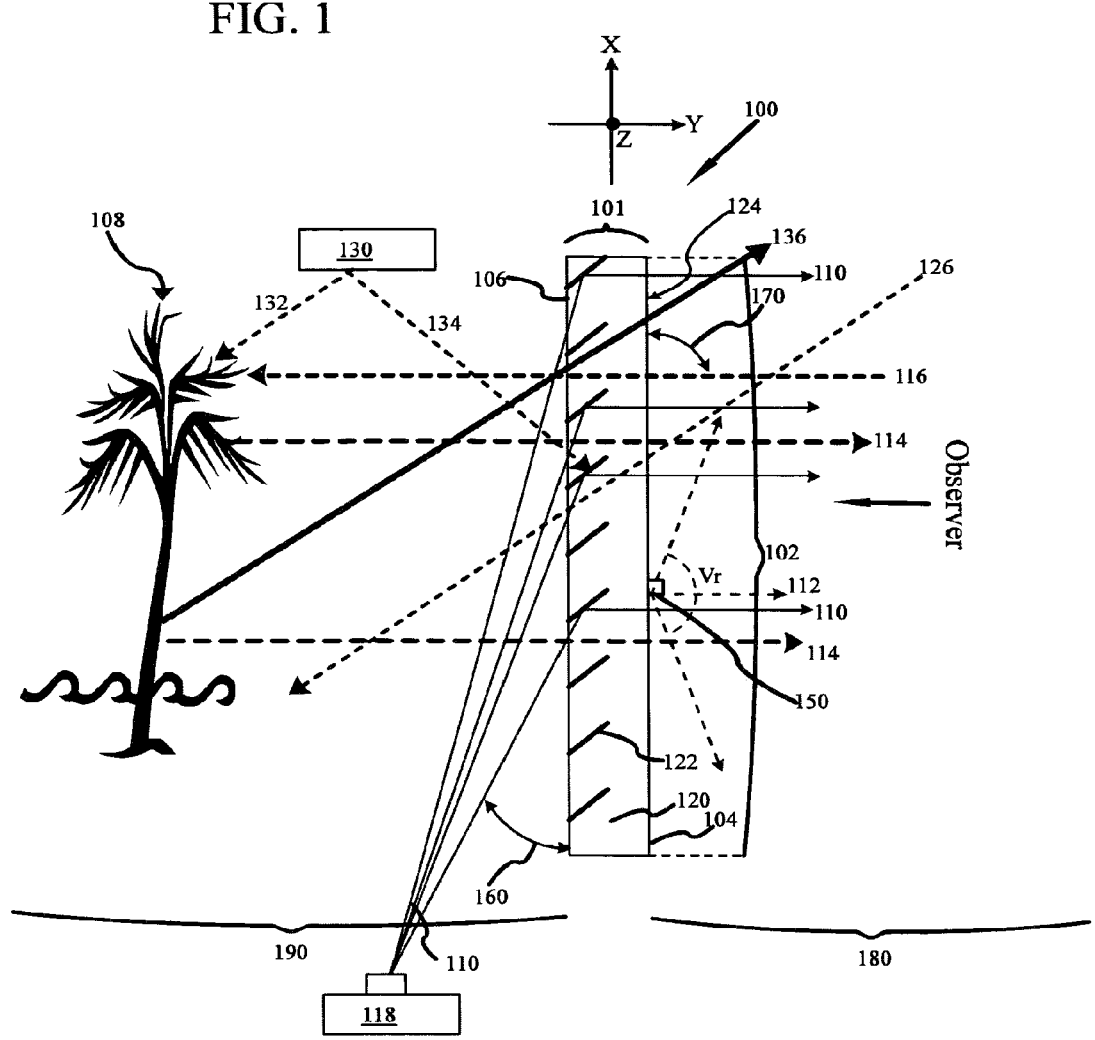
FIG. 1 is a side view of a see-through display according to an embodiment.

FIG. 1 conceptually illustrates a portion of a see-through display 100. In at least one embodiment, the see-through display 100 has a see-through screen 102 having a front side 104 and opposite thereto a back side 106, and a thickness 101 (Ts) therebetween. As shown in FIG. 1, no visually obstructing frame, back or case is provided adjacent to the back side 106 that would prevent an observer from seeing an object 108 that is behind the transparent screen 102.

To facilitate the description, the orientations are referenced to the coordinate system with three axes orthogonal to one another, as shown in FIG. 1. The coordinate system is chosen to be fixed to the screen 102. The axes intersect mutually at the origin of the coordinate system, which is chosen to locate at the center 150 of the front side 104 as indicated in the figures. The axes shown in all the figures are offset from their actual locations, for clarity.

In a typical installation, the screen might be hung on a vertical wall for viewing by observers standing up or sitting upright. In this implementation, the X-axis is chosen to be pointing in the vertical direction with the positive direction of the X-axis pointing upwards. The axis that is pointing in the horizontal direction and is perpendicular to the front surface of the screen 102 is chosen to be the Y-axis. Regardless of the actual orientation of the screen, the X-axis hereafter might be referred to as the vertical axis. The direction along the X-axis hereafter might be referred as the vertical direction or the X-direction. The Y-axis hereafter might be referred to as the horizontal-normal axis and the direction along the Y-axis as the horizontal-normal direction or the Y-direction.

Moreover, the Y-coordinate, $Y_f$, of front side 104 of the screen equals zero (0) and the Y-coordinate, $Y_b$, of the back side of the screen 106 is negative and equals −Ts. As shown in FIG. 1, the see-through screen 100 divides the surrounding space into two regions: region 180 and region 190. The Y-coordinate is positive for all points located in region 180. The Y-coordinate is negative and less than −Ts for all points located in region 190. Region 180 may also be referred to as the front region or the front side. Region 190 may also be referred to as the back region or the back side. An observer in the front/back region may also be referred to as a front/back observer. An object in the front/back region may also be referred to as a foreground/background object.

The Z-axis is in the plane of the front side 104 surface and is perpendicular to the X-axis and the Y-axis. Hereafter, the Z-axis might be referred to as the horizontal-in-plane axis and the direction along the Z-axis as the horizontal-in-plane direction or the Z-direction. The positive Z-axis direction points to the observer's right when the observer is facing the screen from the front side. A plane that contains the X-axis and any planes parallel to it hereafter might be referred to as a vertical plane. In at least one embodiment, the screen is flat and is a thus vertical plane. Hereafter, the edges of the screen would sometimes be referred to as the right edge, the left edge, the top edge and the bottom edge, based on the perspective of a front observer.

A plane that contains both the Y-axis and the Z-axis and any planes parallel to it hereafter might be referred to as a horizontal plane. The positions of the see-through screen and objects in the surrounding space can thus be conveniently expressed by their coordinates, for example, the center 150 of the front side 104 of the see-through screen 102 can be referred as location $X_0=0$, $Y_0=0$ and $Z_0=0$ or conventionally (0,0,0). Unless otherwise specified, the positive directions of the axes are indicated by an arrowhead in the Figures.

The see-through display 100 of this invention allows a front observer, under favorable conditions, to see images displayed on the screen and to simultaneously see background objects through the screen. In addition, a back observer can also, under favorable conditions, see images displayed on the screen and simultaneously see foreground objects through the screen. The images displayed on the screen may be the same or different for the front and the back observers.

As is more fully described below, the screen is structured and arranged to receive an image signal light 110 (presented as a collimated light beam) and redirect the image signal light into a range of angles Vr in a vertical plane, the range centered about a normal 112 to the front side 104 as shown in FIG. 1. Similarly, the signal light is redirected into a range of horizontal angles, Hr, in a horizontal plane. Hr is not shown in the figures. The ranges Vr and Hr might be tailored to be different from each other to suit specific applications. For example Hr could be tailored to be less than about ten degrees)(10° for private viewing and made to be nearly one hundred eighty degrees)(180° for comfortable viewing in a home theater environment. In addition, background image light 114 is transmitted generally through the see-through screen 102 with minimal scattering. Moreover, the transparent screen is structured and arranged to combine the image signal light 110 with the background image light 114.

In at least one embodiment, background image light 114 originates as illumination light 116 passing through the see-through screen 102 from the front side 104 to strike a background object 108. In at least another embodiment, additional sources of illumination, such as source 130 are placed at the same side, i.e., the back side of the see-through screen 102, as the background objects 108. Light ray 132 from source 130 illuminates the background object 108 without passing through the see-through screen 102. In another embodiment, the background image is self luminous such as a light bulb or a CRT display, not shown. Background object 108 reflects the illumination light 116 and 132 as background image light 114, which is viewable from the front side 104 by an observer. If background object 108 is self luminous, background image light 114 may emanate from background object 108, for viewing from the front side 104 by an observer. In addition, the majority of ambient light 126 impinging upon the front side 104 is directed generally towards the back side 106. The structural details of the see-through display 100 are described further below.

Likewise, ambient light incident upon the back side 106 is directed generally towards the front side 104 without redirection towards an observer. It is to be understood and appreciated that the light rays 110, 114 and 116 undergo a slight change of direction governed by the Fresnel law of refraction at the interfaces. For ease in illustration and discussion, light rays 110, 112, 114 and 116 are shown as generally straight when crossing interfaces.

In the embodiment as shown, the see-through display 100 is a rear projection display 100. An image source 118 is provided and optically coupled to the back side 104 of see-through screen 102. Image source 118 for a rear projection system may be any device capable of providing a focused image on back side 106 of the screen, such as, for example, a projector. As is further discussed below, image source 118 provides an image in the form of image signal light 110 at an angle 160 that is substantially smaller than ninety degrees) (90° relative to screen 102, as shown in FIG. 1. In FIG. 1 this is accomplished in part by providing the image source 118 below the see-through screen 102.

Background image light 114 emanates from background objects 108 at locations separate and apart from image source 118. Further, ambient light 126 and 132 may be provided by at least one ambient source (not shown) at one or more locations separate and apart from the image source 118. More specifically, image source 118 provides image signal light 110 from a discreet origin that is separate and apart from a second and third location, e.g., the source locations of background image light 114 and/or ambient light 126 and 134 (when source 130 is an ambient light source).

In at least one embodiment the screen 102 consists of a transparent layer 120 and a plurality of louver members 122 at least partially disposed within the transparent layer 120. As in at least one embodiment, the louver members 122 are physical structures, the assembled structure may be referred to as a louver screen 124. The surfaces of the louver members 122 facing the imaging source 118 are capable of reflecting and redirecting the incoming light 110 into a controlled orientation, as described in further details below.

Figure 2:
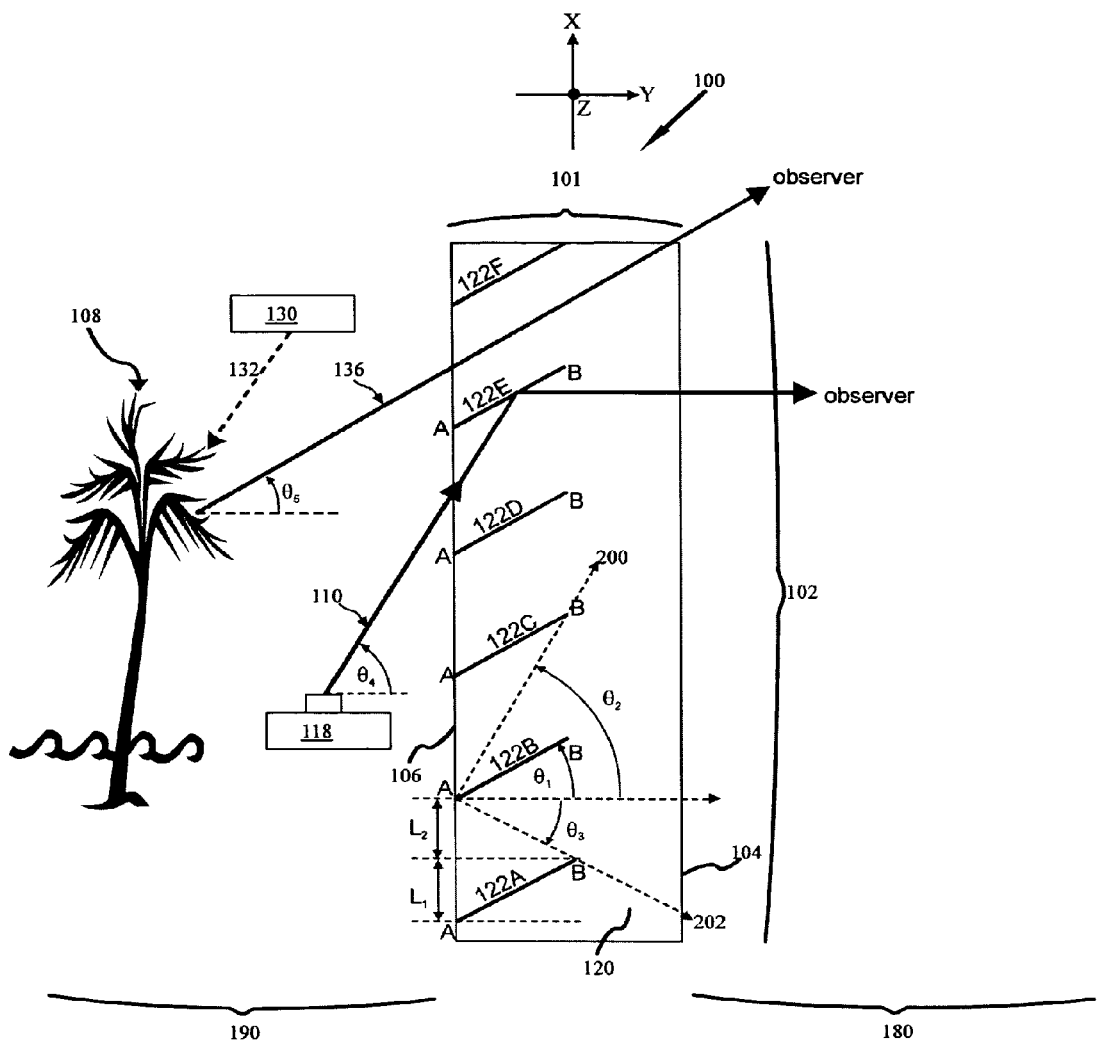
FIG. 2 is an enlarged portion of the see-through display shown in FIG. 1.
Figure 3:
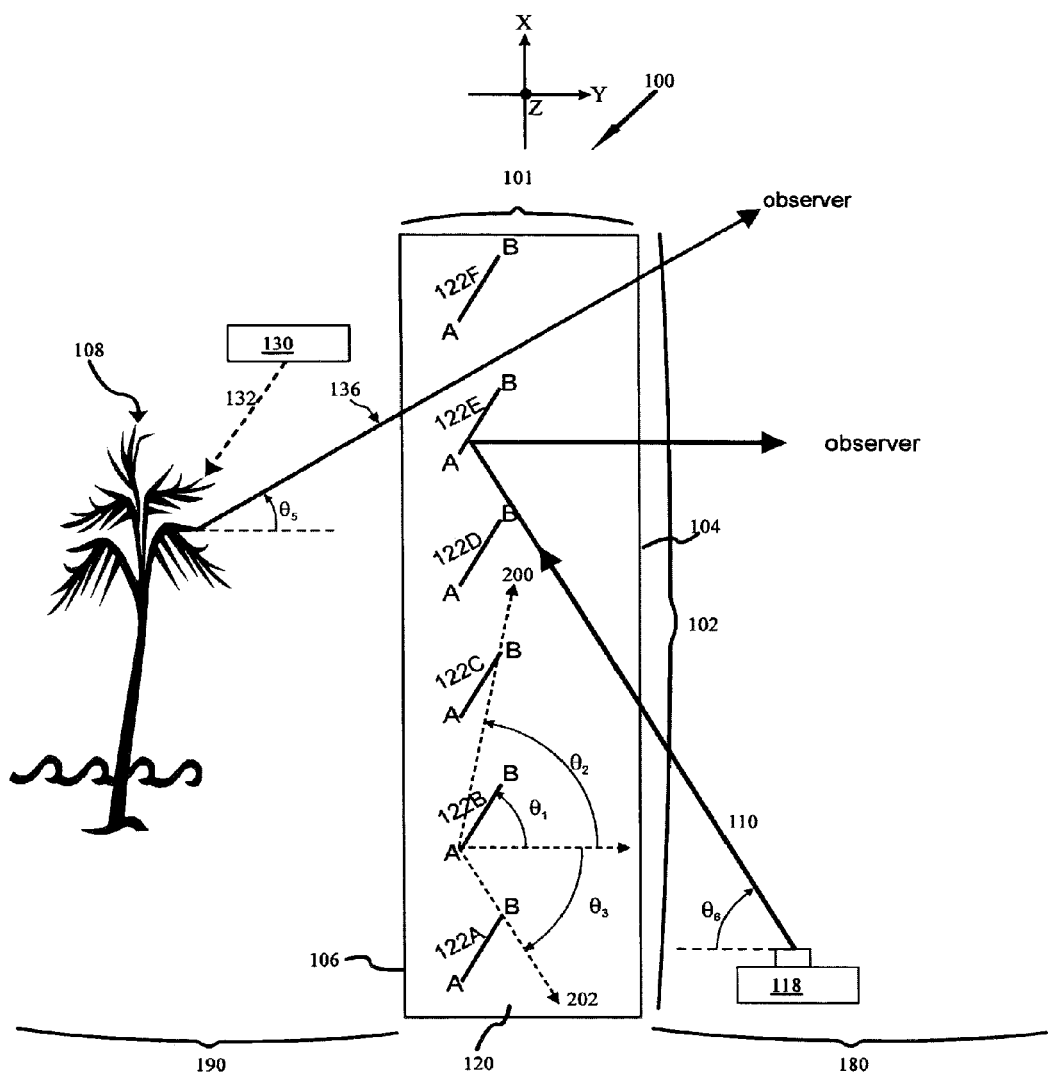
FIG. 3 is a side view of an alternative embodiment of a see-through display configured for front projection.

As is further appreciated with respect to FIGS. 2 and 3 the louver screen 124 may be configured to provide a rear projection system, see FIG. 2, or a front projection system, see FIG. 3. With respect to each configuration, FIGS. 2 and 3 show a cross-sectional view of the see-through display 100 in the X-Y plane.

Referring to the FIGS. 2 and 3, the angles, such as $\theta_4$ of light rays 110 from image source 118, or $\theta_5$ of light rays 136 emanating from objects located in back region 190, are measured with respect to the positive Y-axis. Angles, such as $\theta_6$, of light rays, such as 110 emanating from image source 118 located in the front region 180 are measured with respect to the negative Y-axis. Angles of the physical structures such as louver members 122 are measured with respect to the positive Y-axis. A positive angle is obtained by a counter clockwise rotation from the respective reference Y-Axis. For example, in FIGS. 2 and 3, angles $\theta_1$ and $\theta_5$ are positive angles, while angle $\theta_3$ and $\theta_6$ are negative angles. In the context of this invention, the angles are confined to the range between negative ninety degrees and positive ninety degrees ($-90°$ and $90°$).

As shown in FIGS. 2 and 3, louver members 122 (of which members 122A~122F are exemplary) are oriented at angle $\theta_1$. Vector line 200 connecting the first end A of louver member 122B and the second end B of neighboring louver member 122C is oriented at angle $\theta_2$. Vector line 202 connecting the first end A of louver member 122B and the second end B of neighboring louver member 122A is oriented at angle $\theta_3$. In at least one embodiment, louver members 122 are physical structures of thin film material that can reflect and redirect incident light. The properties of the louver members 122 are further discussed below.

Background object 108 in the back region 190 reflects incident light 131 from an ambient light source, such as light source 130. In at least some settings, it is understood and appreciated that a background object may emit light, such as, for example, when the background object is a light bulb. Through either reflection of ambient illumination or self emission, light rays, such as ray 136, from the background object 108 propagate to and impinge upon the back side 106 of the see-through screen 102 at an angle $\theta_5$. When light ray 136 falls within the angular range bounded by vectors 200 and 202, i.e., when $\theta_3 < \theta_5 < \theta_2$, light ray 136 passes through the see-through screen 102 without being intercepted by louver members 122 and being redirected or absorbed.

Light rays 114 (FIG. 1) and 136 can subsequently be observed by an observer located in the front region 180. The background object 108 is visible within the viewing angle $\theta v$ which is defined by the equation $\theta v = \theta_2 - \theta_3$. Moreover, an observer in the front region 180 can see the background objects in the back region 190 through the see-through screen 102 when within the range of angles bounded by vectors 200 and 202, when the background object 108 emanates or reflects rays 136 that are also within the bounded range of vectors 200 and 202. This range of angles may be referred to as the see-through angular range. Through the reciprocity principle of optics, an observer in the back region can see an object in the front region within the same angular range.

Figure 4:
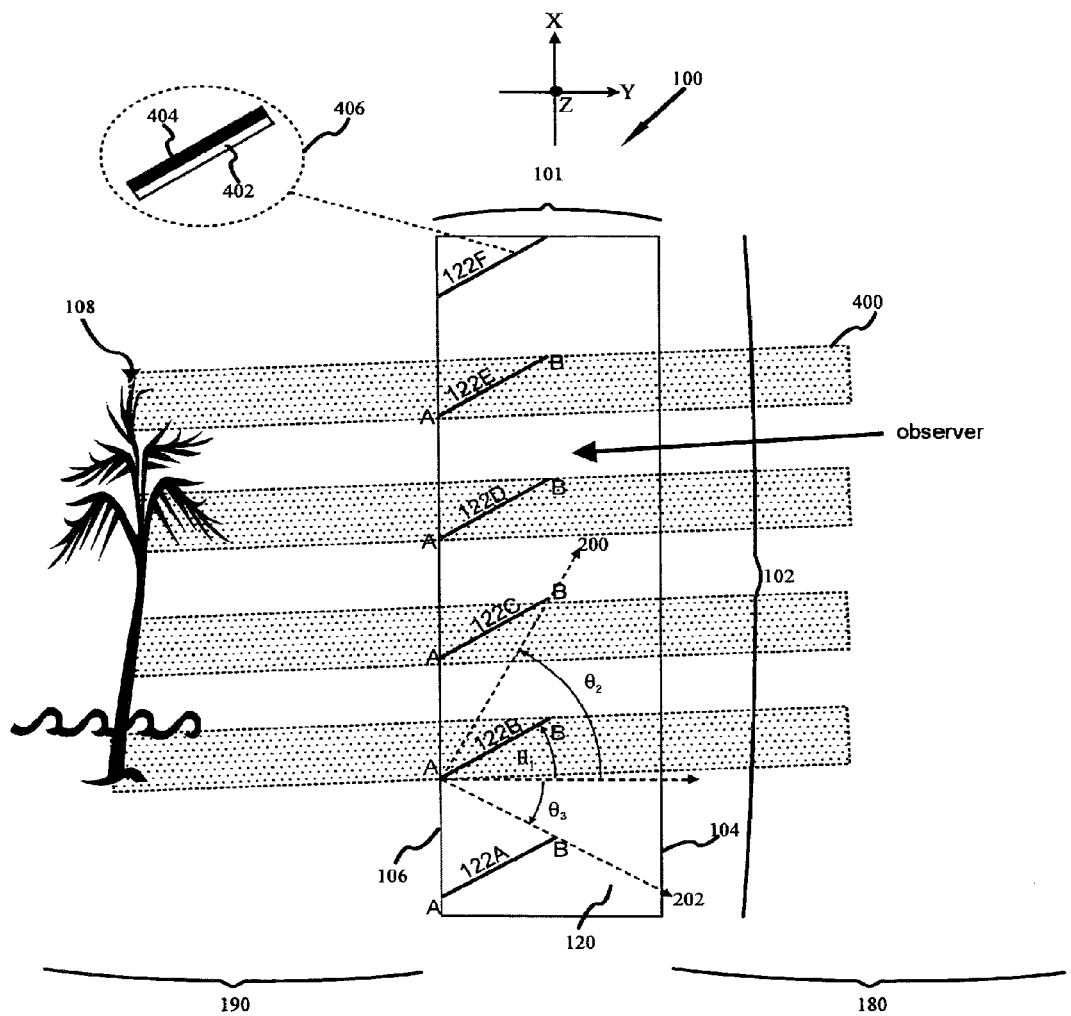
FIG. 4 is the side view of FIG. 2 further illustrating occluded areas.

Within this visible angular range, $\theta v$, portions of the background object are still occluded by the opaque louver members 122, as shown by the shaded areas 400 in FIG. 4. Typically, the linear dimension $L_1$ of the louver members along the X-axis is about one to one hundred (1-100)μm, and the center to center spacing between adjacent louver members is about one to ten (1-10) times the linear dimension $L_1$ of the individual louver members 122. Moreover, there is a clear spacing $L_2$ between neighboring louver members 122. These linear dimensions are chosen so that an observer located at an observing distance from the display cannot resolve the individual louver members. In at least one embodiment, the observing distance is typically a distance of about zero point two meters or more ($\geq 0.2$ m).

The occlusion will show up in the first order as a reduction in the brightness of the background image 108. A fraction, $R_t$, of the light impinging on the see-through screen 102 in the horizontal normal direction is transmitted straight through without being redirected by the louver members 122. $R_t$ equals $L_2/(L_1+L_2)$ and may be referred to as the transmission ratio. In at least one embodiment, $L_1$ equals $L_2$ and along the horizontal normal direction, the see-through screen 102 transmits 50% of the light from background object 108 through the see-through screen 102 to observers in the front region 180. Maximum transmission of light rays 136 from a background object 108 occurs when the ray angle $\theta_5$ is equal to $\theta_1$. The transmission ratio can be tailored for different applications by varying the dimension $L_1$ and $L_2$. To achieve maximum see-through properties for see-through screen 102, it is desirable that $R_t > 0$.

Interference between the periodicity of the louver members 122 and the background object image may manifest as moiré fringes, which are well known in the field of optics. It is also appreciated that an observer looking at the background object 108 through the see-through screen 102 from a different physical location or angle will see a different set of occluded areas.

Outside of the see-through angular range, all light rays emanating from or reflected by the background object 108 are intercepted by one or more louver members 122. As such, the background object 108 is not visible to an observer in the front region 180 looking into the see-through screen 102. In at least one embodiment, the louver members 122 are structured with one light reflecting side 402 and one light absorbing side 404 as shown in the enlargement of FIG. 4 bounded by dotted line 406. In such an embodiment, the louver members 122 are physical structure, wherein side 402 is coated with a light reflecting material such as silver or aluminum, and side 404 is coated with Chromium Oxide ($Cr_2O_3$), Carbon and materials containing carbon, a carbon die or ink, Titanium, and or other materials with low reflectivity of visible light, and or light absorbing properties. Combinations of these materials may also be used.

In at least one embodiment, as is further described below, the louver members 122 are established by depositing thin films. In such an embodiment, the absorbing and reflecting structure shown in the enlargement 406 may be accomplished by successive deposition of light absorbing and light reflecting materials.

In general, with embodiments utilizing the louver members 122 providing the light absorbing side 404 and light reflecting side 402, the ambient light source 130 is positioned such that light rays 134 emanating from the light source 130 and striking the back side 106 of the see-through screen 102 directly are absorbed by sides 162 or otherwise redirected by the louver members 122 away from observers in the front region 180.

Referring back to FIGS. 1 and 2, in at least one embodiment, the image source 118 is placed at a location such that the image signal light 110 impinges on the see-through screen 102 at an angle $\theta_4$ or 160 that is outside the see-through angular range, i.e., $\theta_4 > \theta_2$ or $\theta_4 < \theta_3$. In this case, all the light rays impinging on the back side 106 of see-through screen 102 from the image source 118 are intercepted by the louver members 122 and redirected toward observers in the front region 180.

Similarly, for a front projection system as shown in FIG. 3, the image source 118 is placed at a location such that the image signal light 110 impinges on the see-through screen 102 at an angle $\theta_6$ that is outside the see-through angular range, i.e., $\theta_6 > \theta_2$ or $\theta_6 < \theta_3$. In this case, all the light rays impinging on the front side 104 of see-through screen 102 from the image source 118 are intercepted by louver members 122 and redirected towards observers in the front region 180.

In at least one embodiment of a rear projection configuration as shown in FIGS. 1 and 2, $\theta_1 = 30°$, $\theta_2 = 60°$, $\theta_3 = -30°$, and $\theta_4 = 60°$. The viewing angle through the see-through screen 102 is $\theta_2 - \theta_3 = 90°$. In at least one embodiment of a front projection system as shown in FIG. 3, $\theta_1 = 60°$, $\theta_2 =$ about $80°$, $\theta_3 = -60°$, and $\theta_6 = -30°$. The viewing angle through the see-through screen 102 is $\theta_2 - \theta_3 = 140°$.

It is appreciated that for certain applications, a background object 108 may be purposefully concealed. The background object 108, such as a security camera, is configured so as not to emit and/or reflect visible light towards the see-through screen 102. In addition, the ambient light sources in the front region 180 and back region 190 are arranged so as to provide minimum illumination upon the security camera. As such, the security camera will hardly be visible to an observer in the front region 190 even though it is located in the see-through angular range.

Figure 5:
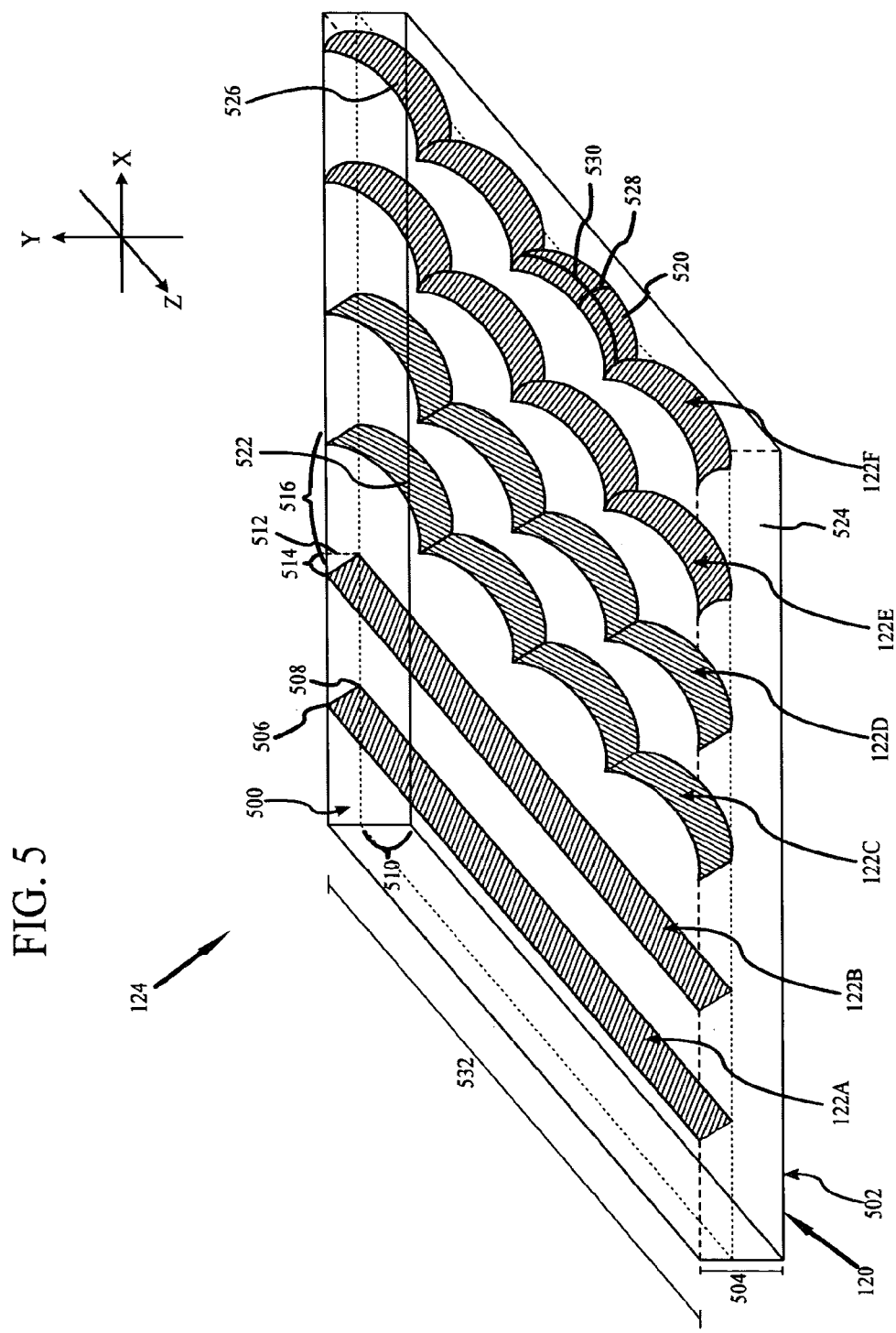
FIG. 5 is a perspective view of a louver screen shown in FIG. 1 according to an embodiment.

The nature of the louver screen 124 is further shown in FIGS. 5 through 12. FIG. 5 conceptually illustrates an enlarged partial perspective view of louver screen 124. In the embodiment shown, louver screen 124 consists of a transparent layer 120 of material having a first side 500 and opposite thereto a second side 502, and a thickness 504 therebetween.

A plurality of louver members 122 are disposed within the transparent layer 120, specifically, exemplary louver members 122A~122F. Each louver member 122 has a first end 506 and a second end 508. As shown, the first end 506 of each louver member is adjacent to the first side 500. The second end 508 of each louver member is proximate to the second side 502. Moreover, each louver member 122 has a component 512 normal to first side 500, the component 512 being a fraction of thickness 504. In addition, each louver member 122 has a component 514 parallel to the first side 500, the component 514 being a fraction of the center-to-center spacing 516 between adjacent louver members 122, more fully described below with respect to FIGS. 5-7.

In at least one embodiment as shown, second end 508 defines a space 510 between the second end 508 and the second side 502. In at least one embodiment, this space 510 serves as added support and/or protection for louver members 122. In an alternative embodiment, the second end 508 may be substantially adjacent to second side 502 such that space 510 does not exist as an integral component of transparent layer 120. In such embodiments, protection and/or support may be provided by an additional transparent layer joined to transparent layer 120 in the illustrated location of space 510.

Figure 8:
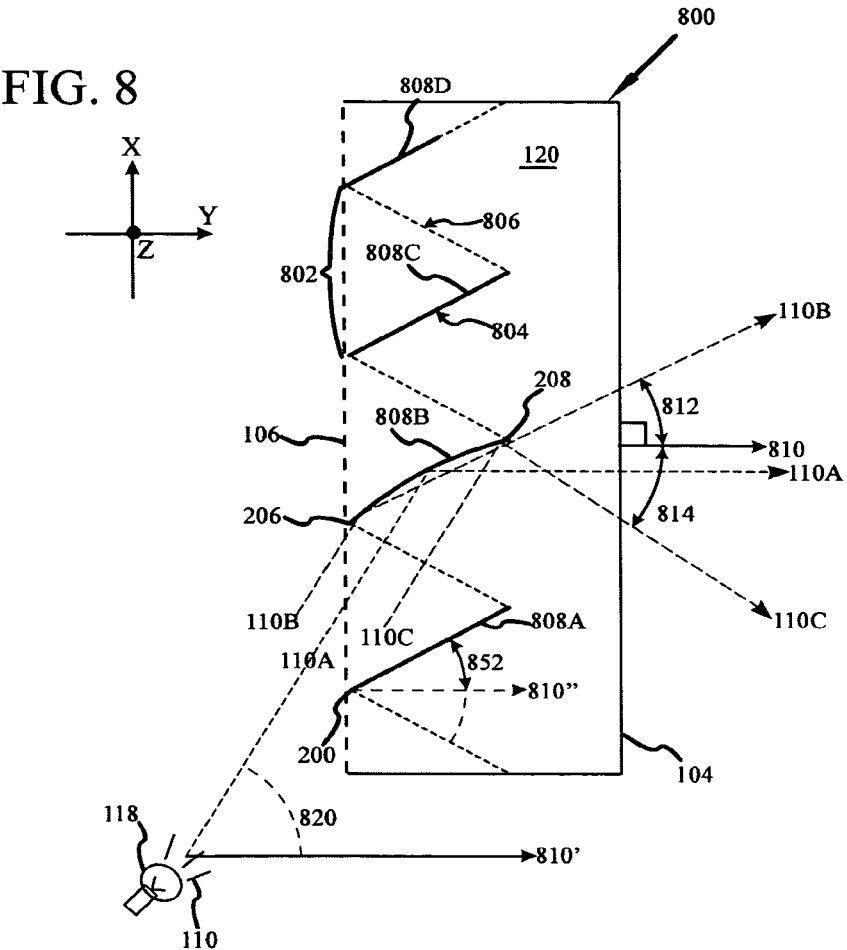
FIG. 8 is an enlarged cross-section view of an alternative embodiment of a louver screen.

In at least one embodiment the louvers 122 are reflective thin film with a thickness of about zero point one (0.1) μm deposited on a grooved surface of the transparent layer 120 as shown in FIG. 8 (the grooves subsequently filled and planarized to provide smooth back side 106). In another embodiment, the louvers 122 may consist of a conglomerate of reflective particles, each with a linear dimension of about one to one hundred (1-100) μm, closely packed and adhered to the grooved surfaces of the transparent layer 120. Filling the groves with a transparent material and planarizing to provide back side 106 protects the louver members 122 and eliminates surfaces that might otherwise act as prisms. The material of reflective particles may be, for example, titanium dioxide or aluminum oxide.

Figure 6:
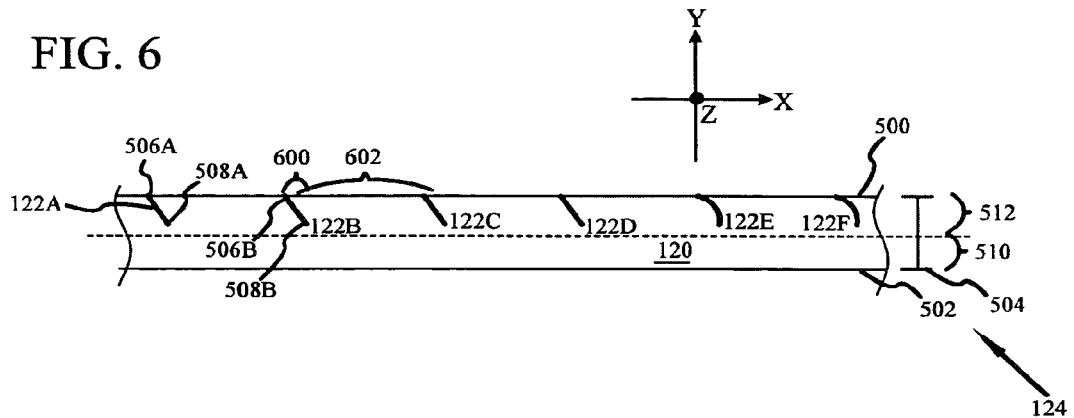
FIG. 6 is a partial side view of the louver screen shown in FIG. 5.
Figure 7:
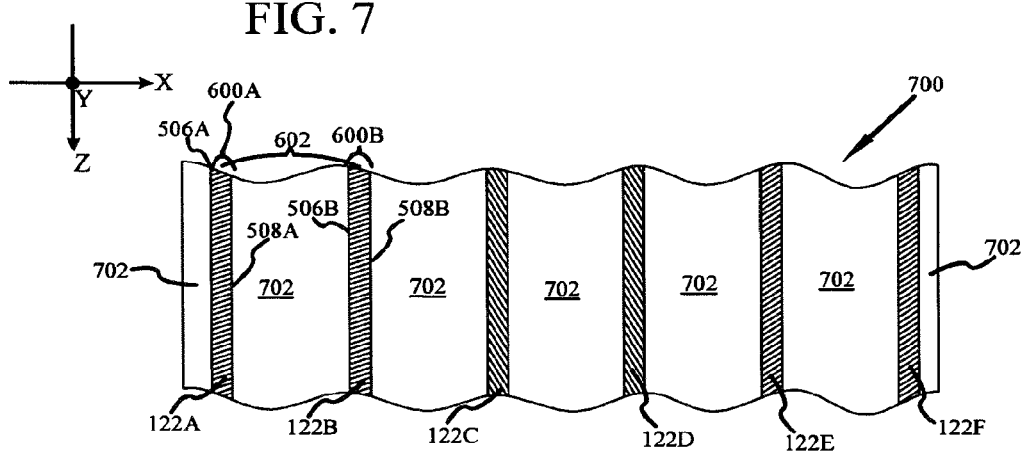
FIG. 7 is a plane view of the projected louver elements shown in FIG. 6.

FIG. 6 is a side view of the louver screen 124 shown in FIG. 5, specifically showing the edge view of louver members 122A~122F in the XY plane. FIG. 7 illustrates the projected components of the louver members 122A~122F onto a plane 700 that is parallel to the first side 500, i.e., plane 700 is an XZ plane. Each louver member 122 has a projected component 600 in plane 700.

In at least one embodiment as shown, the projected second end 508A of louver member 122A does not overlap the projection of the first end 506B of adjacent louver member 122B, such that the projected component 600A is a fraction of the center-to-center distance 602 between adjacent louver members 122, e.g., louver members 122A and 122B as shown. In other words, in at least one embodiment, the louver members 122 are arranged in non-overlapping rows relative to a normal to the front side 104 (see FIG. 1), corresponding to the second side 502 in FIG. 5. Moreover, in at least one embodiment, there are transparent areas 702 in plane 700 between projected components 600.

As used herein, the term "transparent" is generally defined to include the definitions of "capable of transmitting light so that objects or images can be seen as if there were no intervening material," and "easily seen through." In at least one embodiment, transparent layer 120 may be aptly described as translucent; in that transparent layer 120 may be colored, polarized and/or intentionally diffusing.

Returning to FIG. 5, in at least one embodiment, the louver members 122 are aligned to receive light entering the first side 500 from an angle that is outside of the see-through angular range as described above, relative to the first side 500 and direct the light out the second side 502 at a range of angles that is typically symmetrical about the Y-axis.

Each louver member 122 has a reflective surface 520. In at least one embodiment this is a textured surface, and in an alternative embodiment it is a smooth surface. In another embodiment, the louver member consists of at least one layer of closely packed particles with linear dimensions of about one to one hundred (1-100) μm. The louver members 122 may take many forms. Exemplary louver members 122A~122B are substantially flat members. Exemplary louver members 122C~122D include cylindrical mirror sections, e.g., a mirror segment 522 of louver member 122C has a curved cross-section along the first side 500 and a straight cross-section along a side 524 of transparent layer 120. Exemplary louver members 122E-122F include elliptical mirror segments, e.g., mirror segment 526 of louver member 122F has a curved cross-section along the first side 500 and a curved cross-section along side 524.

Moreover, in at least one embodiment, the louver members 122 are shaped louver members. More specifically, in at least one embodiment, each surface 520 has at least one first curvature 528 along a first axis (e.g., Y-axis) and at least one second curvature 530 along a second axis (e.g., Z-axis) transverse to the first axis.

In addition, the shaped louver members 122 are grouped into at least one subgroup, the shaped louver members 122 within the subgroup being systematically arranged in one embodiment, and randomly distributed in an alternative embodiment. Further, the size and shape of each shaped louver member 122 may be smaller than each image pixel. Further still, in at least one embodiment, the shaped louver members 122 are provided by reflective particles rather than a continuous film of material.

Figure 10:
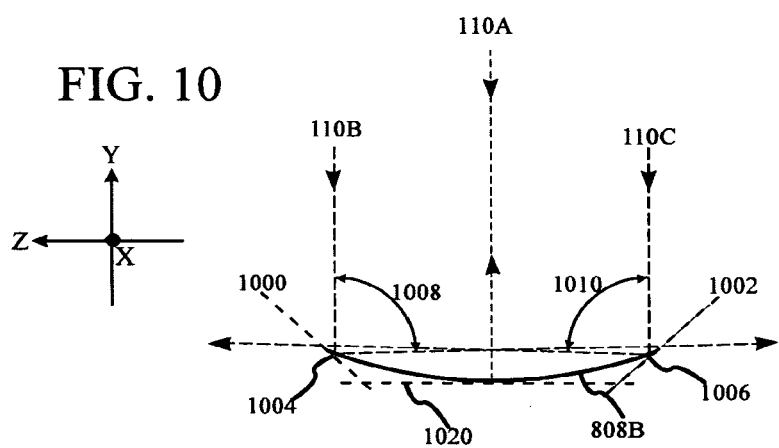
FIG. 10 is a top view of a louver element shown in FIG. 9.
Figure 9:
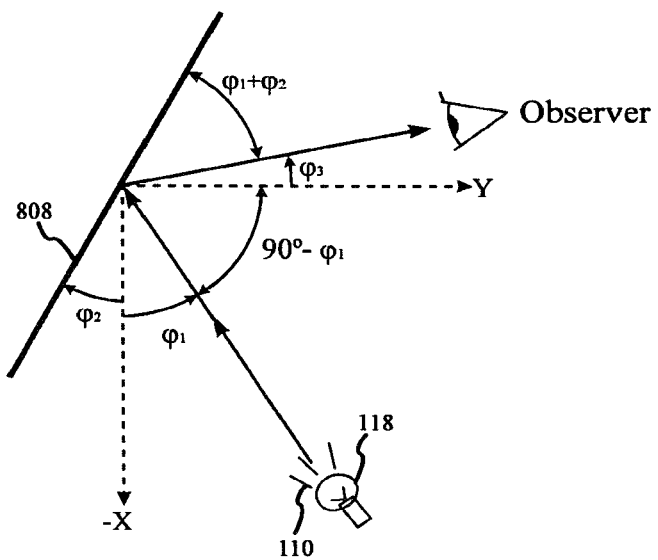
FIG. 9 illustrates the optimal louver alignment angles and reflected/refracted components for incident light.
Figure 9:
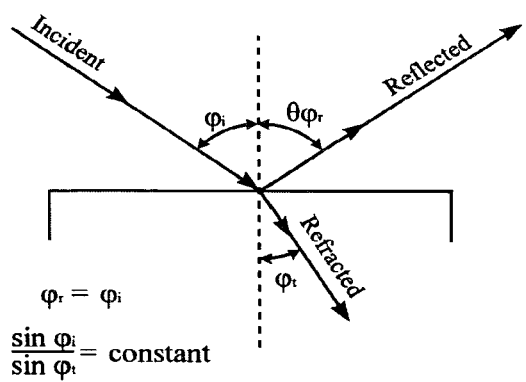

As stated above, in at least one embodiment, at least one advantageous aspect of see-through display 100 is that the louver screen 124 is structured and arranged so that each louver member receives the image signal from a source at a range of angles, which is typically less than about one degree (1°) and redirects the image signal into a range of angles centered about a normal to the front side of the screen. FIGS. 8~10 are provided to further illustrate this aspect of see-through display 100. Multiple image sources may be used to construct a bi-directional screen as described above.

FIG. 8 presents an enlarged cross-section view of an embodiment of a louver screen 800 in an XY plane. As shown, louver screen 800 has a transparent layer 120 shown to initially have a plurality of grooves 802, each groove having at least a first surface 804 intersecting a second surface 806. Louver members 808, of which louver member 808A~808C are exemplary, are established in at least one embodiment by disposing a reflective material upon each first surface 804. In at least one embodiment, the reflective material is deposited on a fraction of first surface 804 as exemplified by louver member 808D. As stated above, the louver members 808 may have a light reflecting side 402 and a light absorbing side 404 (see FIG. 4).

The second surface 806 is not coated and therefore remains transparent, and is thus shown as a dotted line. Following the establishment of the louver members 808, the grooves 802 are filled with transparent material and planarized to provide a substantially smooth side 106 (shown in dotted relief) parallel to front side 104. It is of course understood and appreciated that louver members 808 are substantially identical with louver members 122; however, a different numbering convention has been applied in FIG. 8 for ease of discussion.

The relationship between the angle of incidence and the angle of reflection by the louver members is conceptually illustrated in FIG. 9. With respect to FIG. 9, the relationship between $\phi_1$, the incident angle of light from the image source, $\phi_2$, the angle of the louver reflector, and $\phi_3$, the nominal viewing angle, may be expressed by Equation 1 below:

$$\phi_1 + 2\phi_2 + \phi_3 = 90°$$   Equation 1

The angles $\phi_1$ and $\phi_2$ are measured with respect to the negative X-axis and the angle $\phi_3$ is measured with respect to the positive Y-axis. The positive directions of the angles are indicted by the arrow heads. Typically the screens are designed for the observers to view the screen around a nominal viewing angle $\phi_3=0°$. Examples of the orientations for the louver mirrors to achieve this viewing condition are summarized below:

For a front projector with an incident angle $\phi_1=30°$, optimal reflector angle is $\phi_2=30°$
For a rear projector with an incident angle of $\phi1=-30°$, the optimal reflector is $\phi_2=60°$ Instead of a flat reflector, the reflecting surface of the louver may be curved to produce the ranges of viewing angles as indicated by the angular ranges Vr and Hr introduced earlier. Curved louvers are discussed in further detail below.

FIG. 9 depicts a portion of a single louver member 808. In addition, louver member 808 is shown as not being embedded in the transparent layer, and the light from imaging source 118 is not passing through the transparent layer before striking the louver member 808. Thus the incident light form the image source 118 and the reflected light from the louver member 808 are assumed to be in the same optical medium, for example air. As shown, single louver member 808 may be a component of a front projection embodiment as is further described below.

When the image light passes into the transparent layer before striking the louver member, as in FIG. 8, the light rays undergo an additional change of direction as they enter and leave the transparent layer by the amount shown in FIG. 9. These additional angular changes may be calculated and accounted for in the structure and arrangement of the louver members in such embodiments so as to compensate for these additional changes in the directions of the incident and reflected light rays. These additional angular changes are not shown in the other figures so as to minimize confusion.

Returning to FIG. 8, in at least one embodiment for a rear projection system, the front side plane 104 is parallel to the back side 106 plane. The image signal light 110 impinges upon the back side 106 at an angle 820 of about sixty degrees (60°) relative to normal 810' that is perpendicular to the back side plane 106. Normal 810' is also parallel to a normal 810 of the front side 104. Both normals 810 and 810' are parallel to the Y-axis. To redirect the incident light into the Y-direction, the louver members 808 are angled at about thirty degrees (30°) relative to 810", shown as angle 652. This corresponds to the condition where the incident angle $\phi_1=-30°$ and the louver angle $\phi_2=60°$ in FIG. 9.

In an alternative embodiment for front projection (not shown), the image signal light 110 impinges upon the front side 104 at angle of about sixty degrees (60°) relative to normal 810. The louver members 808 are aligned at about sixty degrees (60°) relative to normal 810 to the front side 104. This corresponds to the condition where the incident angle $\phi_1=30°$ and the louver angle $\phi_2=30°$ in FIG. 9. The positive direction of normal 810 is indicated by the direction of the arrow, which is pointing to the right-hand side of the page. The positive direction is the same for reference normals 810' and 810", each parallel to normal 810. In FIG. 9, angles $\phi_1$, and $\phi_2$ are measured with respect to the negative X-axis, while angle $\phi_3$ is measured with respect to the positive Y-axis of the Cartesian coordinate system defined earlier.

Louver member 808B has been illustrated as a curved louver member, specifically a vertical circular arc segment with an arc angle of about thirty degrees (30°). The plane tangent to the louver at the center of the louver member is oriented at an angle of about thirty degrees (30°) with respect to the normal 810'. As such, the incoming signal light 110A~110C is received at a single angle relative to the louver screen 800 and redirected into a range of angles. More specifically, image signal light ray 110A is striking at about the center of louver member 808B and is therefore directed through front side 104 in a direction approximately normal to the surface of front side 104. Image signal light ray 110B is striking near the first end 506 of louver member 808B and is therefore directed through front side 104 at first angle 812. Image signal light ray 110C is striking near the second end 508 of louver member 808B and is therefore directed through the front side 104 at a second angle 814.

In at least one embodiment, the arc angle of the curved louver member is between about twenty to forty degrees (20°~40°.) This curved louver will reflect a collimated light beam, such as those represented by the light rays 110A, 110B and 110C, into a diverging beam that is spread between the first and second angles 812 and 814. The angular divergence of the reflected beams 812 and 814 is between about twenty to forty degrees (20°~40°) relative to normal 810, providing a vertical viewing range, Vr, which is depicted in FIGS. 1 and 10~12 of about forty to eighty degrees (40°~80°.)

FIG. 10 presents a top view of louver member 808B. The curve 808B shown in FIG. 10 depicts the intersection of the louver member with a YZ plane, and is symmetrical about the Y-axis. In this view the image signal light 110 strikes the louver member 808B from an origin below the plane of the paper. The image signal light 110 is reflected by the louver member and may emerge from the front side in a direction that is above, below or in the plane of the paper. For simplicity of illustration, FIG. 10 illustrates the projection of the incoming and exiting rays in the plane of the paper.

The following description of the ray traces applies to the projection of the light rays onto the plane of the paper, i.e., the YZ plane as indicated by the Cartesian coordinate axes. The incoming rays 110A, 110B and 110C are parallel to the Y-axis. The plane 820 that is tangent to the center point of the intersecting curve 808B is perpendicular to the Y-axis. Tangents 1000, 1002 at both the first end 1004 and the second end 1006 of louver member 808B subtend an angle of forty-four degrees (44°) to the Y-axis as shown in FIG. 10. The projection onto the YZ plane of the image signal light ray 110A strikes at about the center of louver member 808B perpendicular to the surface and is therefore reflected back onto itself.

Image signal light ray 110B is striking near the first end 1004 of louver member 808B and is directed off at a first angle 1008. Similarly, image signal light ray 110C is striking near the second edge 1006 of louver member 808B and is directed off at a second angle 1010. Other image signal light rays are distributed over the surface of 808B and the reflected rays are distributed in between the extreme angles 1008 and 1010. In at least one embodiment, the extreme angles, i.e., the first and second angles 1008 and 1010, are both about eighty-eight degrees (88°), thus providing a horizontal viewing range, which is the sum of angles 1008 and 1010, of about one hundred seventy six degrees) (176°). In another embodiment, 808B has a varying curvature across to tailor the angular intensity of the reflected beam. In yet another embodiment, varying curvature of 808B produces a total viewing angle, Vh, of one hundred eighty degrees (180°) and Lambertian distribution of angular intensity distribution.

Returning again to FIG. 5, louver members 122C~122F are each illustrated as having four sections for ease of discussion and illustration. It is to be understood that each louver member may have one section or, as shown, may consist of many identifiable sections. The typical length of the sections, measured along a center curve, such as 530, is about ten to two hundred (10-200)µm. Moreover, in at least one embodiment, each segment, e.g., 522 or 526, is a separate identifiable louver member. In addition, each louver member 122 may have a length about equal to the length 532 of transparent layer 120, or a fraction thereof.

In at least one embodiment, the louver members 122 within louver screen 124 are substantially identical. In yet another alternative embodiment, the louver members 122 within louver screen 124 may be different from one to another, such as for example a mixture of flat and shaped louvers having elliptical and/or cylindrical mirror segments, and/or a mixture of louvers with different sized elliptical and/or cylindrical mirror segments with flat louvers, and/or a mixture of louvers with random shapes and sizes. In other words, in at least one alternative embodiment the plurality of louver members 122 may be sub-grouped, each sub-group consisting of at least one louver member. In such a configuration, the one or more members within each sub-group may be substantially identical or different from one another, and may be substantially identical or different from the members of another subgroup. In at least one embodiment of such a configuration, a sub-group is a pixel of the screen.

In at least one embodiment, louver members 122 are physically reflective surfaces. More specifically, in one embodiment each louver member 122 is a light reflective material or is established from a light reflective material such as metal (for example, without limitation, silver or aluminum) or a good reflector (for example, Titanium dioxide or aluminum oxide) or a conglomerate of fine particles made of these reflective materials. The size of the particles typically ranges from about one to one hundred (1-100)µm. Whether a physical structure or a coated structure, the light reflective material is sufficiently thick so as to be non-light transmissive. In an embodiment utilizing silver or aluminum, the thickness of the silver or aluminum material may be about zero point one (0.1)µm thick.

In an alternative embodiment, louver members 122 are established from a light transmissive material having a different index of refraction from transparent layer 120. As the indices of refraction are different, louver members 122 will bend and/or reflect light in specific ways depending on the angle of incidence of light provided through first side 500.

In yet another alternative embodiment, louver members 122 are coated with a holographic film, or textured so as to provide physical relief holograms. In at least one such embodiment, these hologram segments are coated with reflective material to further augment the dispersion of light.

In at least one embodiment, transparent layer 120 and, more specifically, louver screen 124 is flexible. Such flexibility permits louver screen 124 to bend or otherwise contort as may be desired in certain viewing locations and/or to withstand physical stress and/or abuse. In at least one embodiment, the flexibility permits louver screen 124 to be rolled away when not in use. In at least one other embodiment, the louver screen 124 is flexible and attached to a transparent flexible backing to enhance the physical durability while maintaining the flexibility.

Figure 11:
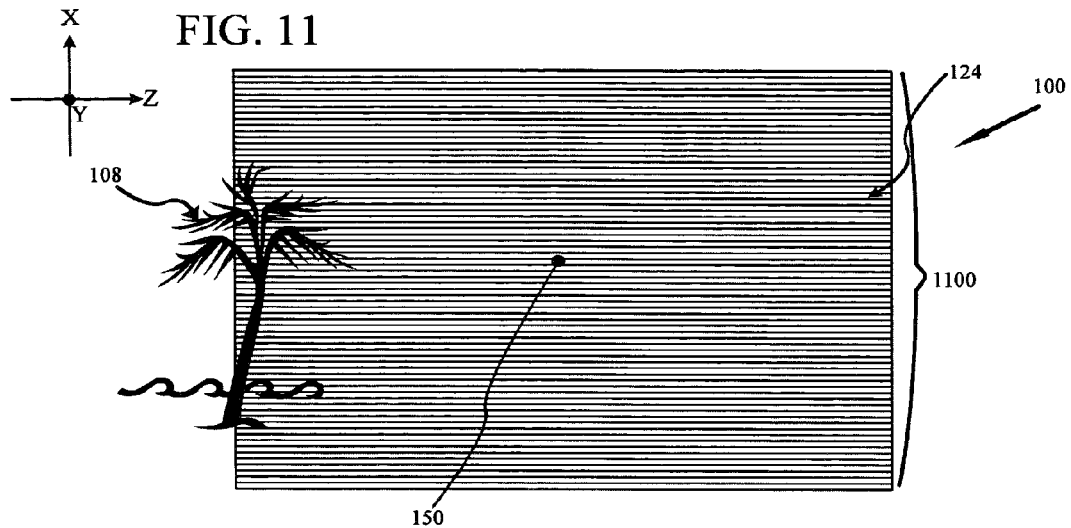
FIG. 11 is a front view of a louver screen showing parallel rows of louver members according to an embodiment.
Figure 12:
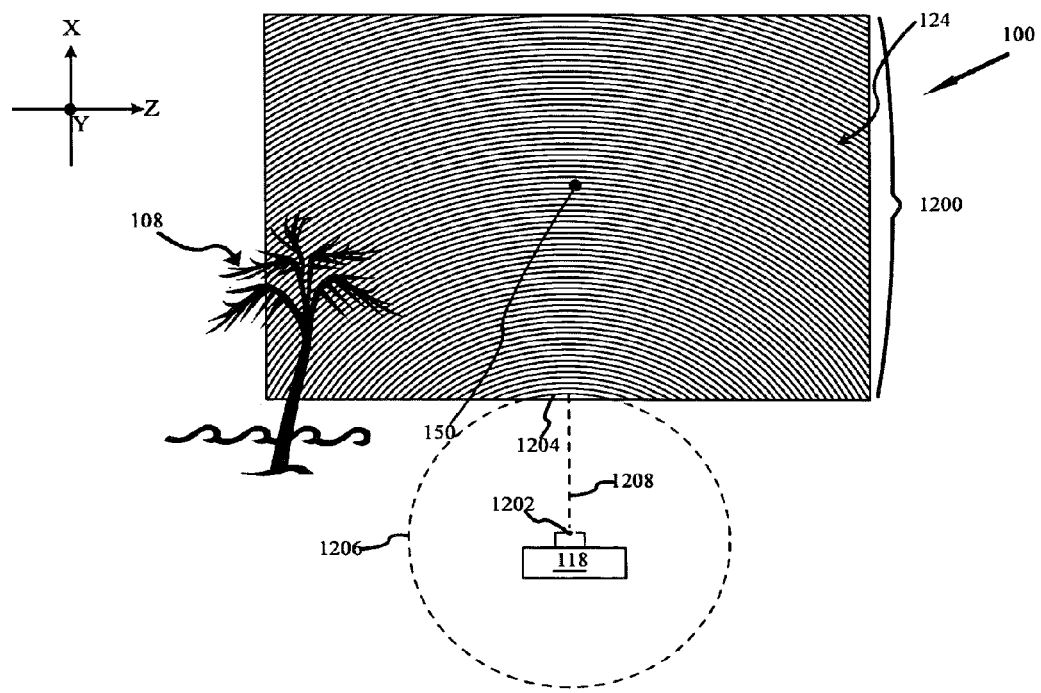
FIG. 12 is a front view of louver screen showing curved rows of louver members according to yet another embodiment.

FIGS. 11 and 12 conceptually illustrate different arrangements of the louver members. As shown in FIG. 11, in at least one embodiment, louver members 122 are arranged in straight parallel rows 1100 across louver screen 124. An alternative embodiment is shown as FIG. 12, wherein the louver members 122 are arranged in curved rows 1200 with equal spacing therebetween. Image source 118 is positioned at a distance along the Y-axis and oriented to direct image light into the plane of the see-through display 100. Location 1202 is the projection of the location of the projector onto the plane of the screen. In at least one embodiment such as that shown in FIG. 12, the curved rows 1200 are concentric to location 1202. Moreover, louver row 1204 is an arc section of circle 1206 having radius 1208 extending from center location 1202 at the image source 118.

As shown in both FIGS. 11 and 12, background object 108 is visible through louver screen 124. As such, it is appreciated that see-through display 100 may be employed in environments where it is desirable to display visual information to an observer while simultaneously permitting the observer to view background items such as object 108.

In light of the above description of louver screen 124, the conceptual depiction of FIG. 1 may be more fully appreciated. Specifically, the apparent solid reflective surface provided by louver members 122 from the perspective of image source 118 insures that image signal light 110 from image source 118 is directed towards an observer. Background image light (shown as thick dotted arrows 114) incident upon the back side 106 of the louver screen 124 is transmitted through the louver screen 124 between the louver members 122 with minimal scattering. Background light 114 has a small probability of encountering the louver members 122 and being redirected. Even so, the majority of the background light 114 passes directly through louver screen 124 to reach the eye of an observer.

In addition, the majority of ambient light 126 incident upon the front side 104 of louver screen 124 (or the back side 106) passes through louver screen 124 between the louver member 122. Ambient light 126 also has a small probability of encountering the louver members and being reflected.

In the event that background image light 114 or ambient light 126 encounters a louver member 122, the alignment of louver members 122 is such that background image light 114 or ambient light 126 is, in general, reflected in a direction either toward the back side 106 of the screen 102, or back out of the front side 104, but in a direction away from the observer instead of back towards the observer.

In at least one embodiment, the first or the front side 104 and the back side 106 of screen 100 are both smooth and will reflect a fraction of the background image light 114 or ambient light 126. In at least one embodiment, an antireflective coating is applied to the front side 104 and/or back side 106 so as to reduce the amount of reflected ambient light.

Figure 13:
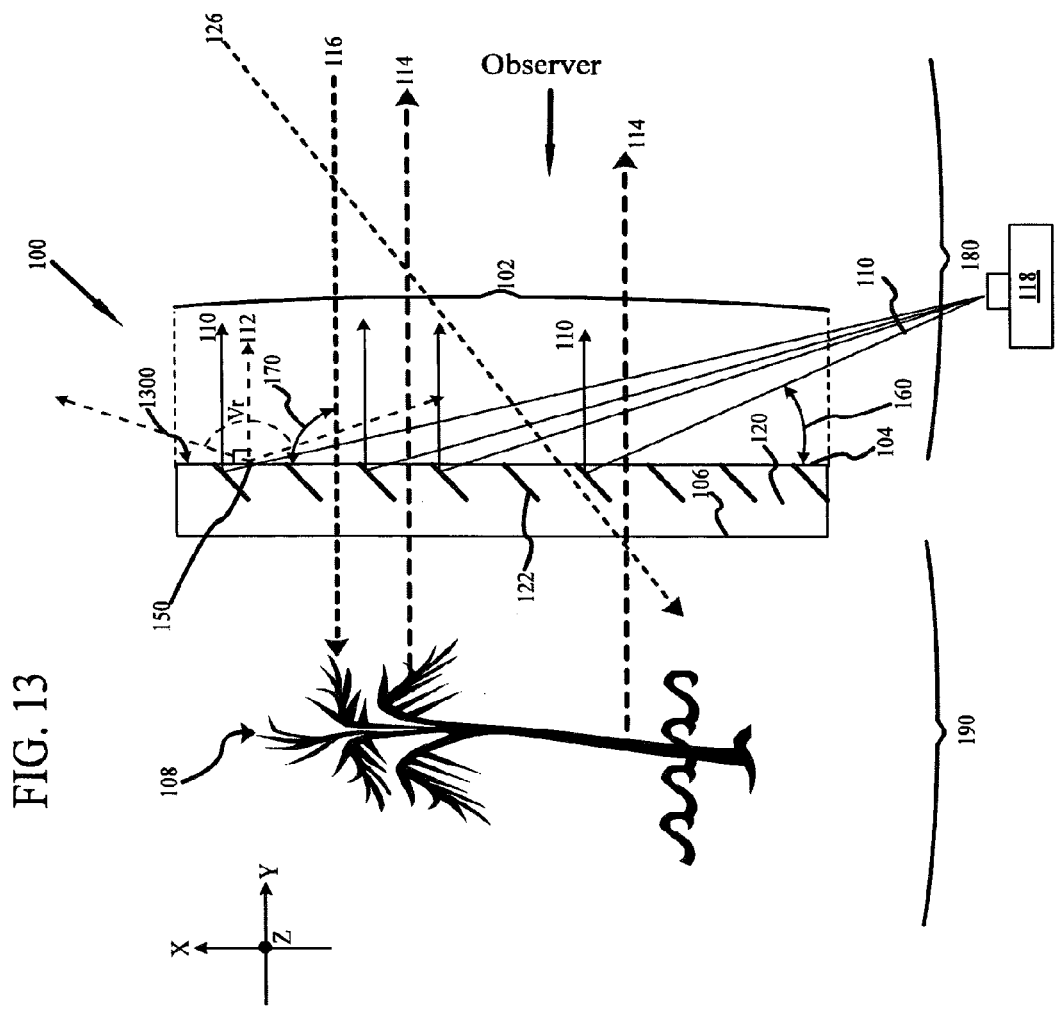
FIG. 13 a side view of a see-through display according to yet another embodiment.

It is also to be appreciated that see-through display 100 may be placed directly upon (i.e., in intimate contact with) a background object, such as a map, chart, picture or other image. For example, see-through display 100 may be placed upon a map so as to provide an observer with a navigation route. As shown in FIGS. 12, 13, due to the front and back sides 104, 106 being parallel and smooth, as well as the scale and periodicity of the louver members, there is appreciably no parallax error in viewing the background object 108. Placing the see-through display 100 in intimate contact with the background object 108 will also not result in appreciable parallax error.

FIG. 13 illustrates an alternative embodiment of see-through display 100 configured for front projection. Whereas in FIG. 3 the louver members 122 are shown disposed proximate to the middle of the transparent layer 120, in FIG. 13, the louver screen 1300 is substantially identical to the louver screen 124 of FIG. 1, both in function and in structure. As shown in FIG. 13, the orientation of louver screen 1300 has been reversed such that the louver members 122 are adjacent to the front side 104. Image signal light 110 provided by image source 118 is again provided at angle 160 (corresponding to angle $\theta_6$ in FIG. 3), and as such may encounter an apparent solid reflective surface provided by louver members 122.

Background image light 114 reflected from object 108 and incident upon the back side 106, has a greater chance of passing through the louver screen 1300 between louver members then encountering louver members 122. In other words, the majority of background image light 114 incident upon the back side 106 is transmitted through the front side 104 with minimal scattering. As background image light 114 emerges from front side 104 it is effectively combined with the redirected image signal light 110, such that an observer perceives the visual image transmitted by image signal light 110 superimposed upon background object 108.

And again, ambient light 126 incident upon either the front side 104 or the back side 106 generally travels through see-through display 100 without redirection towards the observer. Ambient light 126 that encounters louver members 122 is generally directed away from an observer. In at least one embodiment louver screen 1300 is flexible, so as to permit, for example, roll away storage of see-through display 100.

To further assist image signal light 110 in reaching louver members 122 and background image light 114 to pass through louver screen 1300, an antireflection coating as described above may be disposed upon the front side 104 and the back side 106. Such an antireflection coating may also reduce the reflection of ambient light 126 incident upon front side 104; however, the improved contrast of see-through display 100 and reduced ambient reflection is principally due to ambient light 126 passing through louver screen 1300 without reflection to the observer.

Figure 14:
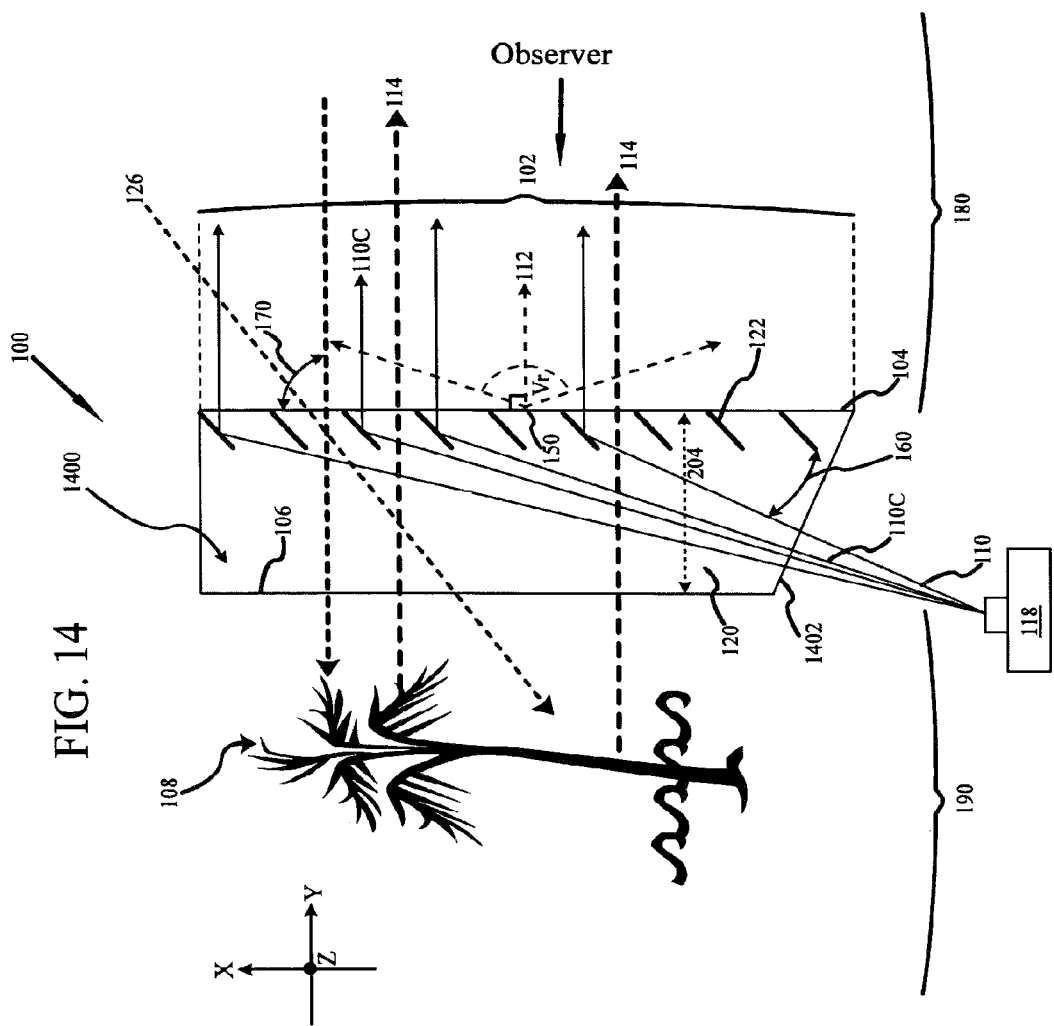
FIG. 14 a side view of a see-through display according to still another embodiment.
Figure 15:
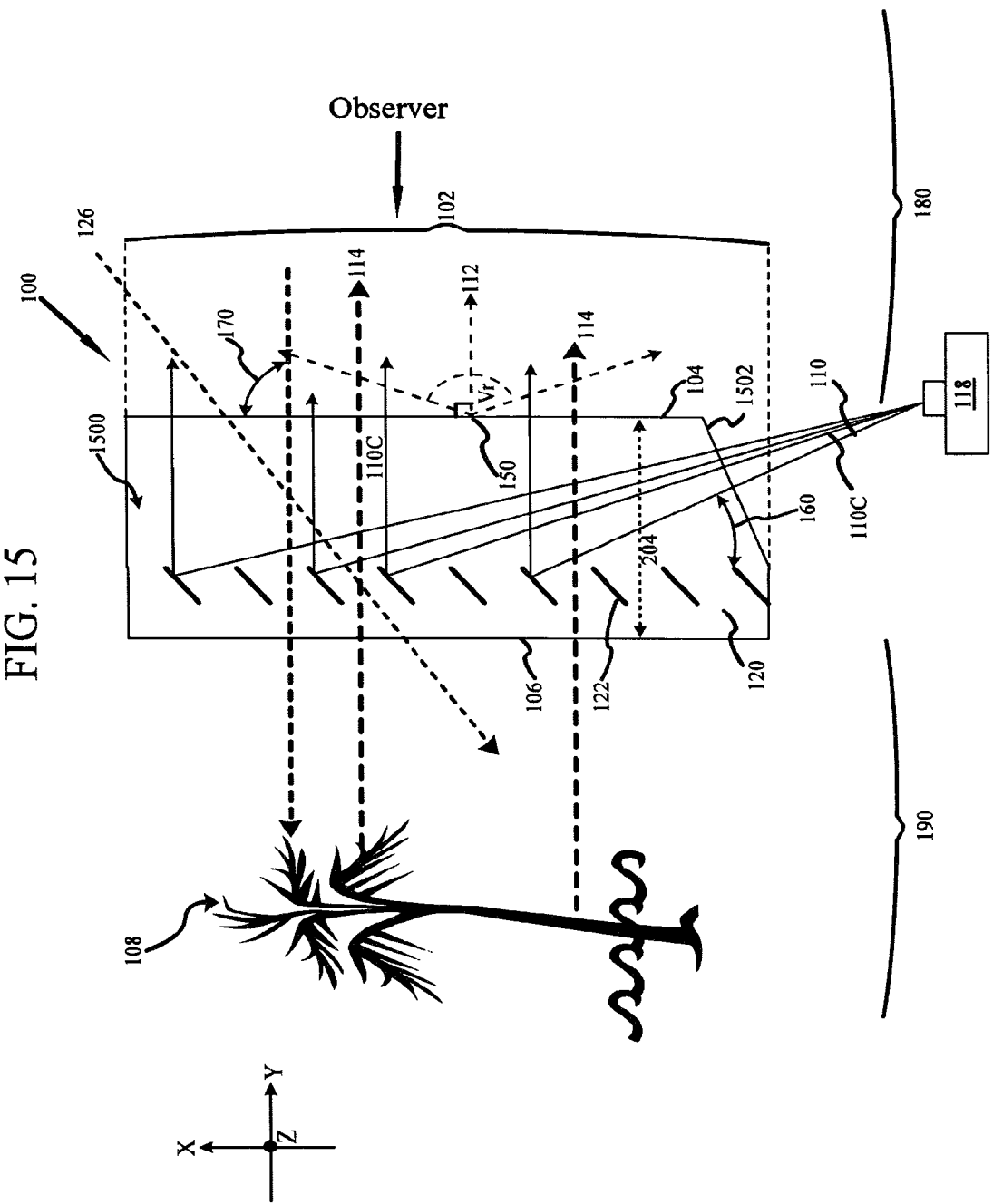
FIG. 15 is a side view of a see-through display according to yet another embodiment.

FIGS. 14 and 15 illustrate alternative embodiments of see-through display 100 wherein the image source 118 provides image signal light 110 to the bottom of the transparent layer 120, rather than to either the front side 104 or the back side 106. With respect to FIGS. 14 and 15, louver screens 1400, 1500 are similar to louver screen 124, 1300 of FIGS. 1 and 13, respectively; however, the thickness 504 (see FIG. 5) of transparent layer 120 is considerably greater. More specifically, the thickness is sufficient to accommodate presentation of all image signal light 110 to the bottom surface 1402, 1502 of the louver screen 1400, 1500. In addition, the bottom surface 1402, 1502 is angled so as to be perpendicular to central light ray 110C presented from image source 118.

As shown, light rays 110 travel from the image source, through the bottom surface 1402, 1502 and strike louver members 122. More specifically, light rays 110 do not experience internal reflection from the front side 104 or the back side 106; rather, they travel in a generally straight path from the image source 118 to the louver members 106.

Background image light 114 reflected from object 108 and incident upon the back side 106, has a greater chance of passing through the louver screen 1300 between louver members then encountering louver members 122. In other words, the majority of background image light 114 incident upon the back side 106 is transmitted through the front side 104 with minimal scattering. As background image light 114 emerges from front side 104 it is effectively combined with the redirected image signal light 110, such that an observer perceives the visual image transmitted by image signal light 110 superimposed upon background object 108.

Once again, ambient light 126 incident upon either the front side 104 or the back side 106 generally travels through see-through display 100 without redirection towards the observer. Ambient light 126 that encounters louver members 122 is generally directed away from an observer. With either embodiment as shown in FIG. 14 or 15, to further assist image signal light 110 in reaching louver members 122, an antireflection coating as described above may be disposed upon the front side 104 and/or the bottom surface 1402, 1502.

Figure 16:
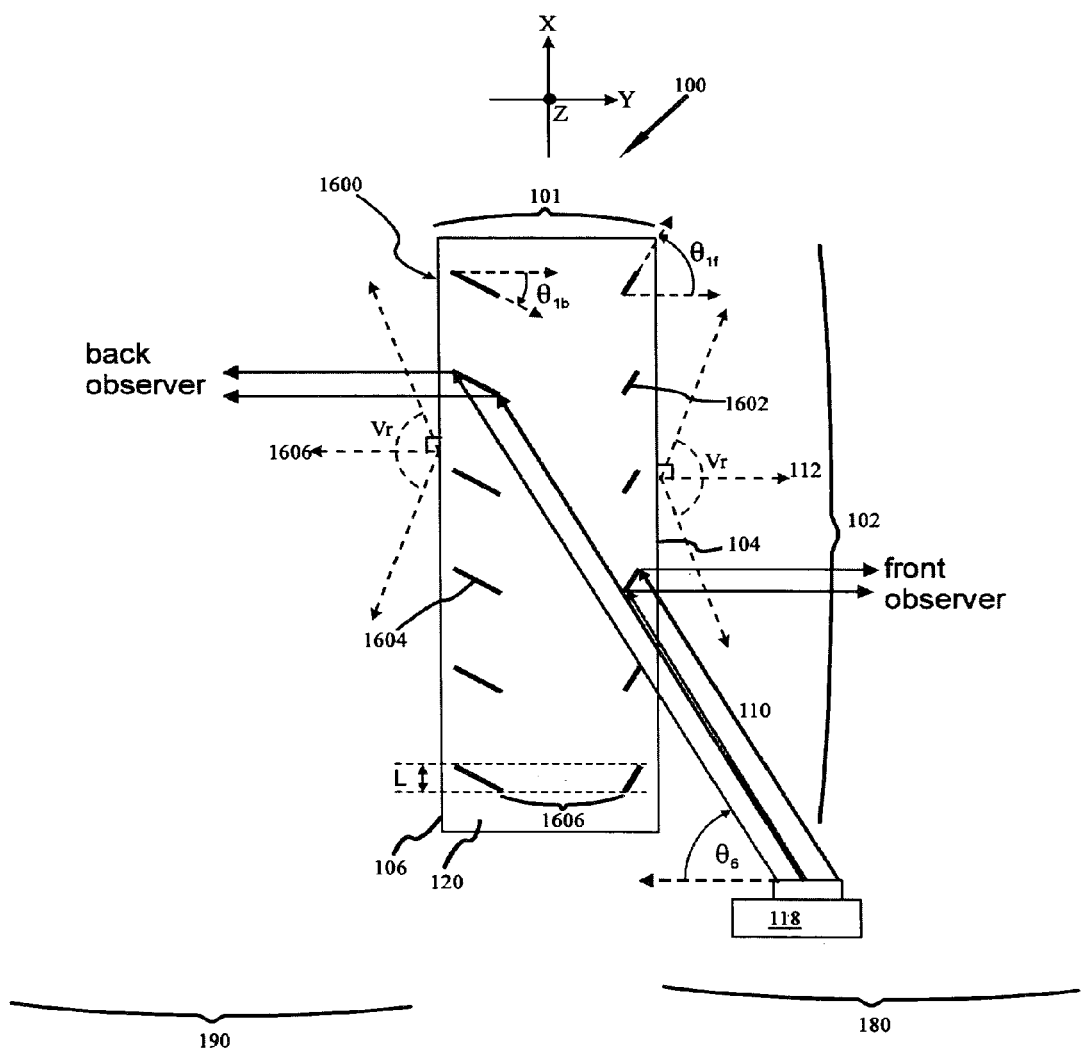
FIG. 16 is a side view of a see-through display according to a further embodiment.
Figure 17:
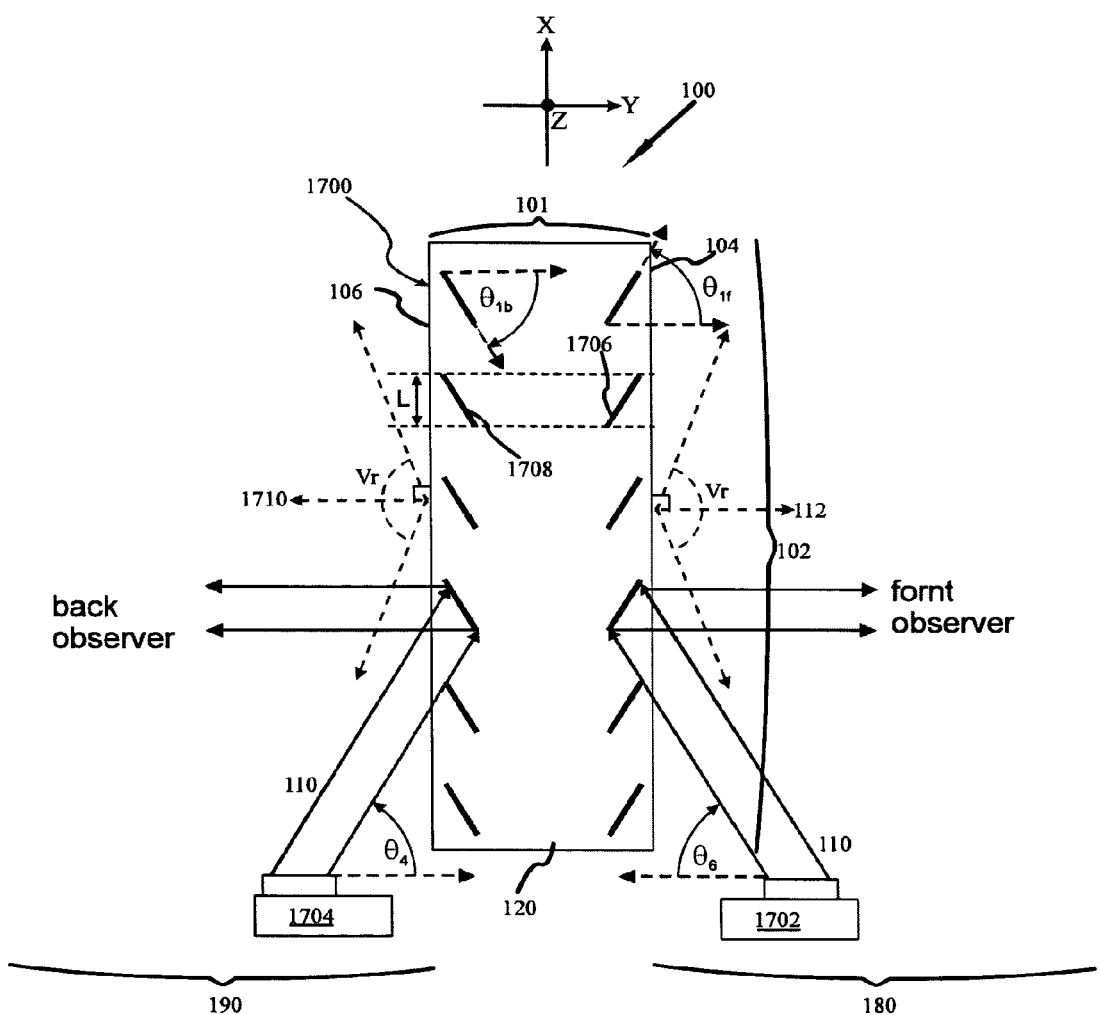
FIG. 17 is a side view of a see-through display according to yet a further embodiment.

In the above described embodiments the images projected upon the see-through screen 102 and redirected by the louver members 122 are visible by viewers only on one side, typically in the front region 180 as illustrated. FIGS. 16 and 17 illustrate yet other alternative embodiments for two-way or bi-directional see-through louver screens 1600, 1700.

As shown in FIG. 16, a single image source 118 provides image signal light which is redirected to observers in both the front region 180 and rear region 190. Such dual redirection is achieved with two sets of louver members 1602 and 1604 disposed within transparent layer 120 which more or less equally split the image signal light 110 and redirect it into positive and negative Y-axis directions.

Each set of louver members 1602, 1604 is substantially identical to louver member 122 as described above. As described above, each set of louver members 1602, 1604 is structured and arranged to receive an image signal light 110 (presented as a collimated light beam) and redirect the image signal light into a range of angles Vr in a vertical plane. In the case of the louver members 1602, the range is centered about a normal 112 to the front side 104. In the case of the louver members 1604, the range is centered about a normal 1606 to the back side 106.

In at least one embodiment, louver members 1602 are disposed adjacent to the front side 104 of the see-through louver screen 1600 and louver members 1604 are disposed adjacent to the back side 106 of the see-through louver screen 1600. In at least one embodiment, the louver members 1602 (the front set) are oriented at $\theta_{1f}=60°$ and redirect the image light 110 from the image source 118 towards the front observer. The louver members 1604 (the back set) are oriented at $\theta_{1b}=-30°$ and redirect the image light 110 from the image source 118 towards the back observer.

As in FIG. 3, image source 118 is placed in front of the see-through screen 1604 and configured to provide image signal light 110 at angle $\theta_6=-60°$. The linear dimension, L, of the louver members 1602, 1604 along the x-axis is about twenty five (25)μm. The periodicity is about every one hundred (100)μm. The distance 1606 between the sets 1602, 1804 is about eighty five (85)μm. In such a configuration, about seventy five percent (75%) of the light of a background object will transmit through the see-through screen 1604 in the Y-direction. The distance between the sets of louvers is chosen such that all image signal light 110 is intercepted and substantially equally divided for redirection towards observers on either side of the see-through louver screen 1600.

FIG. 17 presents yet another alternative embodiment for the bi-directional see-through display utilizing a front image source 1702 and a rear image source 1704. Image sources 1702, 1704 are substantially identical to image source 118 as described above. In this embodiment, one image may be presented to an observer in the front region 180 and a different image may be presented to an observer in the back region 190. For the embodiment shown, the angles of projection are $\theta_{1b}=-60°$ and $\theta_{1f}=60°$. In this instance, the louver members 1706 (the front set) are oriented at $\theta_{1f}=60°$, and the louver members 1708 (the back set) are oriented at $\theta_{1b}=-60°$.

As in FIG. 16, each set of louver members 1706, 1708 is substantially identical to louver member 122 as described above. As described above, each set of louver members 1602, 1604 is structured and arranged to receive an image signal light 110 (presented as a collimated light beam) and redirect the image signal light into a range of angles Vr in a vertical plane. In the case of the louver members 1706, the range is centered about a normal 112 to the front side 104. In the case of the louver members 1708, the range is centered about a normal 1710 to the back side 106.

With respect to sets of louver members 1602, 1604 and 1706, 1708, the signal light is also redirected into a range of horizontal angles, Hr, in a horizontal plane. Hr is not shown in the figures. The ranges Vr and Hr might be tailored to be different from each other to suit specific applications. For example Hr could be tailored to be less than about ten degrees (10°) for privacy and made to be nearly one hundred eighty degrees (180°) for comfortable viewing in a home theater environment.

It is understood and appreciated that alternative locations for each image source may be selected, such as, for example, one or both being located above the screen rather than below it. In addition, as described above, each image source may in actuality be composed of multiple image sources, such as for example red, green and blue projectors.

As shown in FIGS. 16 and 17, it is preferred that the louver members 1602, 1604, 1706, 1708 be entirely embedded within the transparent layer 120. Such embedment provides substantially smooth front and back sides 104, 106 to the see-through louver screens 1600, 1700, and thus minimizes distortion and displacement of the background image which could be caused by prism effects when the front side 104 and back side 106 are not parallel. For optimum utilization of the light output from each image source, the image sources are typically placed outside the see-through angular range as described above such that all image light propagating to the see-through screen is intercepted by the louver members and redirected towards the observers.

In the configuration shown in FIG. 17, each image source is within the see-through zone of either set of louver members. The spacing between the sets of louver members 1706, 1708 and the transparent spacing between neighboring louver members can be adjusted to obtain one hundred percent utilization of the image signal light as provided by each image source.

With respect to both FIGS. 16 and 17, it is understood and appreciated that an observer in the front region 180 may perceive the visual information provided by the image signal, as well as view background objects located in the back region 190. Likewise, an observer in the back region 190 may perceive the visual information provided by the image signal as well as view what are from his or her perspective, background objects located in the front region 180. Each observer may also perceive the other observer.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A screen, comprising:
    a first set of louver members at least partially disposed in the screen and located proximate to a first side of the screen, and
    a second set of louver members at least partially disposed in the screen and located proximate to a second side of the screen,
    wherein an observer on either side of the screen sees an image produced by light directed to that observer by the set of louvers on a same side of the screen as the observer; and
    wherein objects on an opposite side of the screen from the observer are visible to the observer between the louvers.

2. The screen of claim 1, wherein the louver members each have a light absorbing side and a light reflecting side.

3. The screen of claim 2, wherein the light absorbing side of the louver members is coated with materials selected from the group consisting of: chromium oxide, carbon, a carbon die, titanium, and combinations thereof.

4. The screen of claim 1, wherein the louver members comprise a number of cylindrical mirror segments.

5. The screen of claim 1, wherein the louver members comprise a number of elliptical mirror segments.

6. The screen of claim 1, wherein the louver members are arranged in curved rows with equal spacing therebetween, in which the curved rows are concentric to an image signal source.

7. The screen of claim 1, wherein the image signal light is evenly divided into a first and second portion and in which one of the first or second portion of image signal light is provided to observers on either side of the screen.

8. The screen of claim 1, wherein the first set of louver member are configured to receive a first image signal light and the second set of louver members are configured to receive a second image signal light.

9. A screen, comprising:
a first set of louver members at least partially disposed in the screen and located proximate to a first side of the screen, and
a second set of louver members at least partially disposed in the screen and located proximate to a second side of the screen,
said first set of louver members being positioned to receive an image signal light and redirect that image signal light to an observer in front of the screen,
said second set of louver members being positioned to receive an image signal light and redirect that image signal light to an observer in back of the screen, and
wherein objects on an opposite side of the screen from an observer are visible to that observer between the louvers.

10. The screen of claim 9, wherein the louver members each have a light absorbing side and a light reflecting side.

11. The screen of claim 10, wherein the light absorbing side of the louver members is coated with materials selected from the group consisting of: chromium oxide, carbon, a carbon die, titanium, and combinations thereof.

12. The screen of claim 9, wherein the louver members comprise a number of cylindrical mirror segments.

13. The screen of claim 9, wherein the louver members comprise a number of elliptical mirror segments.

14. The screen of claim 9, wherein the louver members are arranged in curved rows with equal spacing therebetween, in which the curved rows are concentric to an image signal source.

15. The screen of claim 9, wherein the image signal light is evenly divided into a first and second portion and in which one of the first or second portion of image signal light is provided to observers on either side of the screen.

16. The screen of claim 9, wherein the first set of louver member are positioned to receive a first image signal light and the second set of louver members are positioned to receive a second image signal light.

17. A method of displaying an image on a screen, comprising:
with a first set of louver members at least partially disposed in the screen and located proximate to a first side of the screen, directing light of a projected image to an observer on said first side of the screen, and
with a second set of louver members at least partially disposed in the screen and located proximate to a second side of the screen, directing light of a projected image to an observer on said second side of the screen
wherein objects on an opposite side of the screen from the observer are visible to the observer between the louvers.

18. The method of claim 17, wherein the louver members are arranged in curved rows with equal spacing therebetween, in which the curved rows are concentric to an image signal source.

19. The method of claim 17, further comprising:
dividing the image signal light evenly into a first portion and a second portion; and
directed said first portion of the image signal light to said first set of louvers and directing said second portion of the image signal light to said second set of louvers.

20. The method of claim 17, further comprising:
with the first set of louver members, receiving a first image signal light; and
with the second set of louver members, receiving a second image signal light.

* * * * *